(12) United States Patent
Chippa (10) Patent No.: US 12,441,486 B2
(45) Date of Patent: Oct. 14, 2025

(54) LANDING SYSTEM AND METHOD (71) Applicant: Airbus (S.A.S.), Blagnac (FR)

(72) Inventor: Kiran Kumar Chippa, Bristol (GB)

(73) Assignee: Airbus (S.A.S.), Blagnac (FR)

(*) Notice: Subject to any disclaimer, the term of this patent is extended or adjusted under 35 U.S.C. 154(b) by 569 days.

(21) Appl. No.: 17/895,515

(22) Filed: Aug. 25, 2022

(65) Prior Publication Data

US 2023/0063241 A1 Mar. 2, 2023

(30) Foreign Application Priority Data

Aug. 28, 2021 (IN) .............................. 202121039058

(51) Int. Cl.
*G08G 5/21* (2025.01)
*B64D 45/08* (2006.01)
*G08G 5/30* (2025.01)
*G08G 5/54* (2025.01)

(52) U.S. Cl.
CPC .............. *B64D 45/08* (2013.01); *G08G 5/21* (2025.01); *G08G 5/30* (2025.01); *G08G 5/54* (2025.01)

(58) Field of Classification Search
CPC . B64D 45/08; G08G 5/21; G08G 5/30; G08G 5/54
See application file for complete search history.

(56) References Cited

U.S. PATENT DOCUMENTS

| | | | | |
|---|---|---|---|---|
| 8,234,058 | B1* | 7/2012 | Barber | G08G 5/52 701/120 |
| 8,462,019 | B1* | 6/2013 | VanDerKamp | G08G 5/21 340/539.2 |
| 8,788,128 | B1* | 7/2014 | McCusker | G05D 1/0676 701/4 |

(Continued)

FOREIGN PATENT DOCUMENTS

| | | |
|---|---|---|
| CN | 112880679 A | 6/2021 |
| EP | 3 446 757 A1 | 2/2019 |

(Continued)

OTHER PUBLICATIONS

European Search Report for Application No. 22180158 dated Oct. 26, 2022.

(Continued)

*Primary Examiner* — Sohana Tanju Khayer
(74) *Attorney, Agent, or Firm* — KDW Firm PLLC (57) ABSTRACT

A landing system for an aircraft and a method of calculating a reference path. The landing system can calculate a reference path for use during a non-precision approach to a runway, the reference path including a course, flight path angle, and anchor point. The anchor point has a longitude, a latitude and an altitude. The landing system is configured to extract from a navigation database a missed approach point corresponding to a first landing threshold point of the runway. The missed approach point has a longitude, a latitude and an altitude. The landing system is configured such that calculation of the reference path includes setting (Continued)

the altitude of the anchor point with use of the altitude of the missed approach point. The system may be used when approaching a runway having a displaced landing threshold point, the location of the point not being stored in the navigation database.

20 Claims, 8 Drawing Sheets

(56) References Cited

U.S. PATENT DOCUMENTS

| | | | |
|---|---|---|---|
| 9,174,746 B1* | 11/2015 | Bell | G01C 23/00 |
| 2004/0183698 A1* | 9/2004 | Rouquette | B64D 45/04 |
| | | | 701/16 |
| 2012/0209515 A1* | 8/2012 | Klooster | G08G 5/76 |
| | | | 701/527 |
| 2014/0222257 A1* | 8/2014 | Wyatt | B64D 45/08 |
| | | | 701/16 |
| 2014/0234050 A1 | 8/2014 | Asahara et al. | |
| 2015/0005992 A1* | 1/2015 | Coulmeau | G05D 1/0676 |
| | | | 701/16 |
| 2015/0081143 A1* | 3/2015 | Snow | G08G 5/54 |
| | | | 701/16 |
| 2017/0032683 A1* | 2/2017 | Meserole, Jr. | G08G 5/80 |
| 2017/0108029 A1 | 4/2017 | Song et al. | |
| 2017/0162061 A1* | 6/2017 | Srivastav | G08G 5/55 |
| 2018/0102059 A1* | 4/2018 | He | G08G 5/21 |
| 2020/0150689 A1* | 5/2020 | Khatwa | G06F 16/29 |
| 2020/0290740 A1* | 9/2020 | Rangan | G08G 5/30 |
| 2021/0012671 A1* | 1/2021 | Roger | G08G 5/54 |
| 2021/0383703 A1* | 12/2021 | Venkataramana | G08G 5/76 |
| 2022/0091619 A1* | 3/2022 | Wake | B64U 30/20 |
| 2022/0189323 A1* | 6/2022 | Chaubey | G01S 13/913 |
| 2022/0319338 A1* | 10/2022 | Tazume | G08G 5/76 |
| 2022/0406201 A1* | 12/2022 | Johnson | G08G 5/58 |
| 2022/0406202 A1* | 12/2022 | Cottron | B64F 1/18 |
| 2023/0206774 A1* | 6/2023 | Boyer | G08G 5/21 |
| | | | 701/18 |

FOREIGN PATENT DOCUMENTS

| | | |
|---|---|---|
| EP | 3 741 682 A1 | 11/2020 |
| GB | 2 510 131 A | 7/2014 |
| KR | 2015 0143646 A | 12/2015 |
| WO | WO 2014/172302 A1 | 10/2014 |

OTHER PUBLICATIONS

British Search Report for Application No. 2114707 dated Jul. 1, 2022.

* cited by examiner

LANDING SYSTEM AND METHOD

CROSS-REFERENCE TO RELATED APPLICATION

This application claims priority to Indian Patent Application Serial No. IN 202121039058 filed Aug. 28, 2021, the entire disclosure of which is incorporated by reference herein.

TECHNICAL FIELD

The disclosure herein concerns a landing system for an aircraft. More particularly, the disclosure herein concerns a landing system configured to calculate a reference path which can be used to guide the aircraft towards a runway during a non-precision approach. The disclosure herein also concerns a method of calculating a reference path.

BACKGROUND

A precision approach is a type of instrument approach. During a precision approach, a navigation system is used that provides, to the aircraft, both lateral and vertical (glideslope) guidance. Example navigation systems include Instrument Landing System (ILS), Microwave Landing System (MLS), and GBAS Landing System (GLS). ILS uses ground stations located near the runway that emit radio signals. The aircraft can use the radio signals to determine the deviation of the aircraft from a reference path. The deviation can be displayed to the pilot and/or used by an autopilot to guide the aircraft to the runway. MLS operates using a similar concept.

In the context of the disclosure herein, a non-precision approach is taken to be an approach which is not a precision approach. For example, a non-precision approach may be an instrument approach which uses a navigation system that provides lateral guidance to the aircraft, but does not provide vertical guidance to the aircraft. Non-precision approaches do not include the use of, for example, ILS, MLS or GLS.

For non-precision approaches, a known aircraft system can replicate the ILS concept—in which the aircraft system determines the deviation of the aircraft from a reference path—using only on-board navigation sensors and with no need for additional ground aids. The reference path calculated by the aircraft system is referred to as an FLS virtual beam. FLS stands for Flight Management System (FMS) Landing System.

The FLS virtual beam has a course and a flight path angle, and passes through an anchor point defined by a latitude, longitude and altitude. Once calculated, the aircraft system computes the deviation between the actual aircraft trajectory and the FLS virtual beam. The deviation is shared with a flight guidance system so that corrective actions can be performed to minimize the deviation.

The FLS virtual beam is computed using information for the landing runway extracted from the navigation database of the aircraft, including one or more of: a landing threshold point (LTP), a missed approach point (MAP), a final end point (FEP), and a runway threshold cross height (TCH). These pieces of information are predetermined, for example by the airport operator, and loaded into the navigation database (e.g. prior to take-off).

The landing threshold point is a point at the designated center of the landing runway threshold. The landing threshold point is defined by latitude, longitude and altitude. The landing threshold point is also associated with a course (e.g. bearing) and a flight path angle stored in the navigation database.

The missed approach point is a point at which the pilot must initiate a missed approach procedure if landing criteria, for example the pilot being able to see a particular visual reference (e.g. the runway), have not been met. The missed approach point is defined by latitude, longitude and altitude. The missed approach point is also associated with a course and a flight path angle stored in the navigation database. In general, the missed approach point is the last point of the flight plan entered into the FMS of the aircraft.

The final end point is a waypoint located on the coded final approach path. It is located at the intersection of the final approach leg course and a line perpendicular to that course through the landing threshold point. The final end point is defined by latitude, longitude and altitude. The final end point is also associated with a course and a flight path angle stored in the navigation database.

The runway threshold cross height is the height at which the aircraft should pass over the landing runway threshold. The threshold cross height is often equal to 50 feet (about 15 meters).

Figure 1:
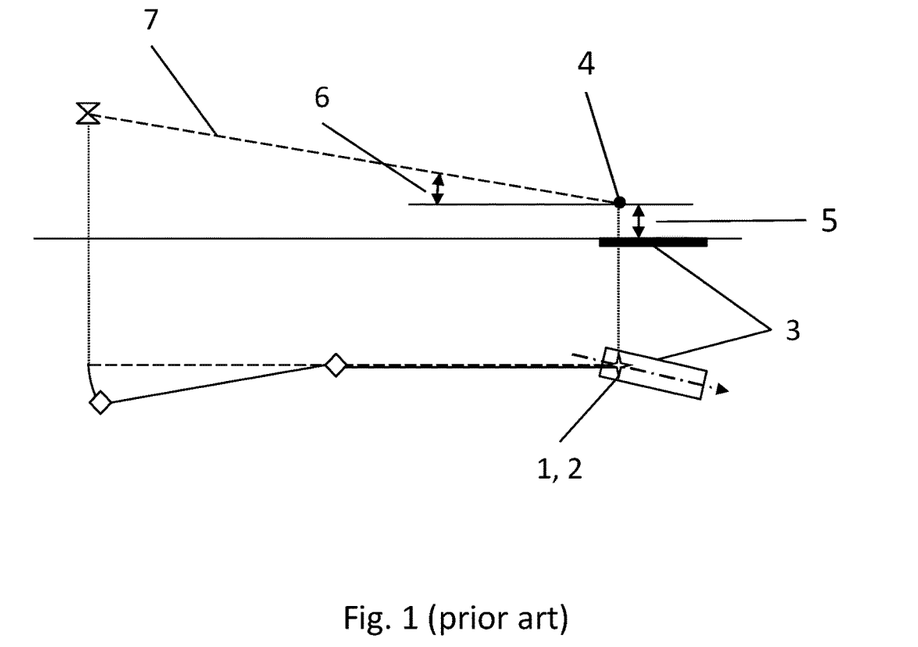
FIG. 1 shows a side view and an overhead view of a reference path calculated for an approach to a runway in accordance with the prior art, a missed approach point being located at the landing threshold point.

For any given runway, how the anchor point of the FLS virtual beam is calculated depends on the location of the missed approach point relative to the landing threshold point. Three cases can be identified, as follows:

In a first case, see FIG. 1, the missed approach point 1 is located at the landing threshold point 2 for runway 3. The latitude and longitude of the anchor point 4 are taken to be equal to the latitude and longitude of the landing threshold point 2. The altitude of the anchor point 4 is taken to be the altitude of the landing threshold point 2 plus the threshold cross height 5. The course and flight path angle 6 of the FLS virtual beam 7 (shown as a dashed line) are taken to be equal to the course and flight path angle associated with the landing threshold point 2.

Figure 2:
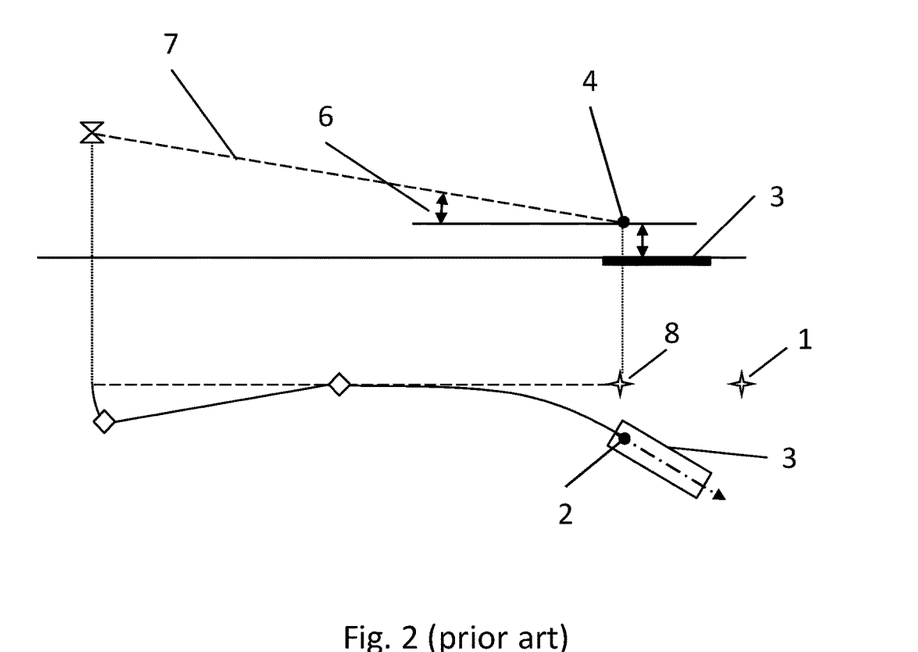
FIG. 2 shows a side view and an overhead view of a reference path calculated for an approach to a runway in accordance with the prior art, a missed approach point being located beyond the landing threshold point.

In a second case, see FIG. 2, the missed approach point 1 is located beyond the landing threshold point 2 for runway 3. The latitude and longitude of the anchor point 4 are taken to be equal to the latitude and longitude of the final end point 8. The altitude of the anchor point 4 is taken to be the altitude of the final end point 8. The course and flight path angle 6 of the FLS virtual beam 7 are taken to be equal to the course and flight path angle associated with the final end point 8.

Figure 3A:
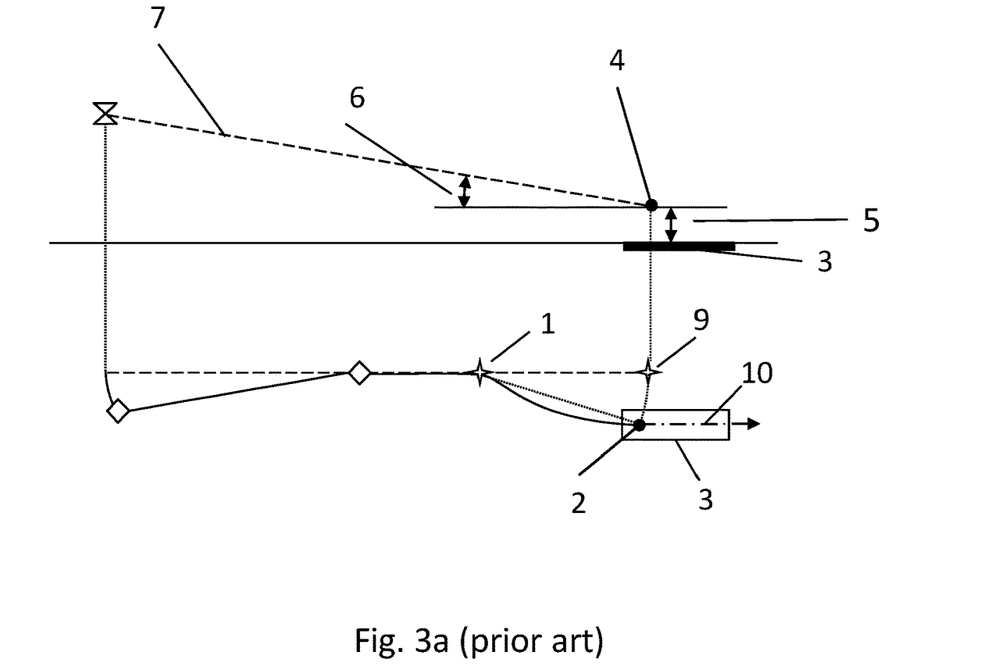
FIGS. 3a and 3b show a side view and an overhead view of a reference path calculated for an approach to a runway in accordance with the prior art, a missed approach point being located before the landing threshold point.
Figure 3B:
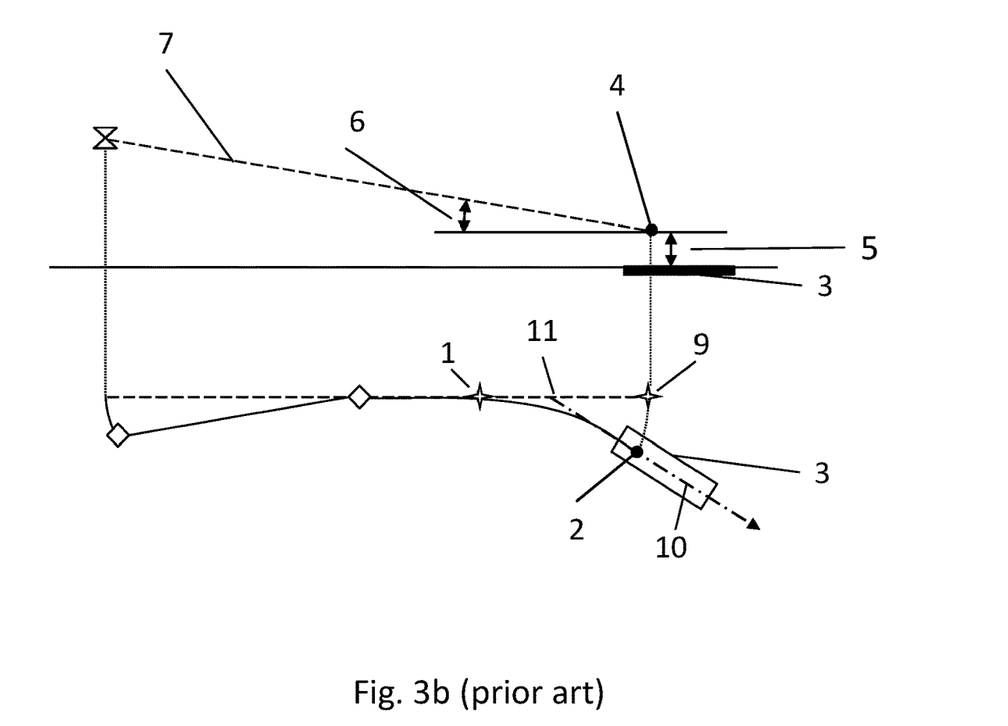

In a third case, see FIGS. 3a and 3b, the missed approach point 1 is located before the landing threshold point 2 for runway 3. The latitude and longitude of the anchor point 4 are taken to be equal to the latitude and longitude of a pseudo-FEP 9. The altitude of the anchor point is taken to be the altitude of the landing threshold point 2 plus the threshold cross height 5. The course and flight path angle 6 of the FLS virtual beam 7 are taken to be equal to the course and flight path angle associated with the missed approach point 1.

If the final approach leg course is parallel and distinct to the runway axis with a course difference between the final approach leg course and the heading 10 of the runway 3 within a 3° tolerance, then the location of the pseudo-FEP 9 is deemed to be at the intersection of an extension of the final approach leg course and an arc centered on the missed approach point 1 and passing through the landing threshold point 2. See FIG. 3a.

If the final approach leg is not parallel with the runway axis within a 3° tolerance, and the course difference between final approach leg course and the heading 10 of the runway 3 is lower than 50°, then the location of the pseudo-FEP 9 is deemed to be at the intersection of an extension of the final approach leg course and an arc centered on the intersection point 11 and passing through the landing threshold point 2. See FIG. 3b.

Figure 4A:
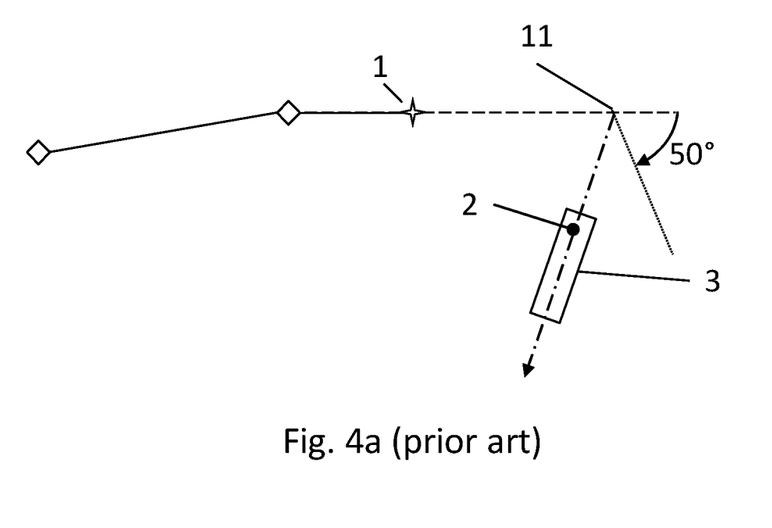
FIGS. 4a and 4b show situations where the prior art system cannot be used to calculate a reference path.
Figure 4B:
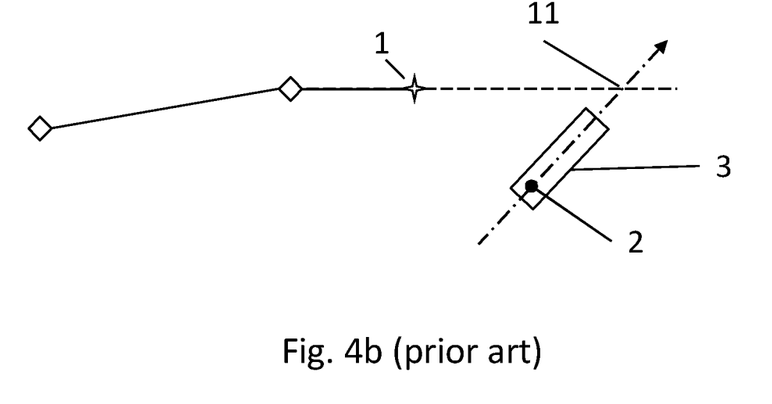

If the above criteria with respect to the course difference are not met, a pseudo-FEP is not calculated by the aircraft system and the system cannot be used to land the aircraft. FIGS. 4a and 4b illustrate situations in which the above criteria are not met. FIG. 4a shows an approach in which the course change between the final approach leg course and runway heading is greater than 50 degrees. FIG. 4b shows an approach in which the intersection point 11 is located beyond the landing threshold point.

Sometimes it is necessary for the landing threshold point of a runway to be displaced from its normal location, for example during planned maintenance of the runway. Furthermore, some runways have multiple landing threshold points. In such cases, approach procedures for the displaced or additional landing threshold point(s) will be determined, and a missed approach point and final end point will be published for each landing threshold point. The missed approach point and final end point for the approach procedure for the displaced or additional landing threshold point(s) will be stored in the navigation database of the aircraft. Prior to landing, the pilot can select the approach procedure for the displaced or (one of) the additional landing threshold point(s) and land according to that procedure.

Some known navigation databases can store only one landing threshold point per runway. This means that it may not be possible to store the displaced or additional landing threshold point(s) in the navigation database (although the corresponding missed approach point and final end point can be stored). If the displaced or additional landing threshold point(s) cannot be stored in the navigation database, those landing threshold point(s) will not be available to calculate an FLS virtual beam for the corresponding approach. In this situation, the aircraft system will be forced to use the stored landing threshold point to calculate the FLS virtual beam. The FLS virtual beam may then not represent the ideal reference path to the runway when taking account of the location of the displaced or additional landing threshold point. In particular, the altitude of the beam is likely to be too low (or too high). As a consequence, the accuracy of the aircraft landing may be reduced. The aircraft may have to be flown either below or above the FLS virtual beam to correctly carry out the approach procedure for the displaced or additional landing threshold point. The pilot workload may be increased as the crew may have to fly manually to land safely, or the aircraft may need to be landed using a different approach type.

The disclosure herein seeks to mitigate one or more of the above-mentioned problems. Alternatively or additionally, the disclosure herein seeks to provide an improved aircraft landing system and/or an improved method of calculating a reference path for landing an aircraft on a runway.

SUMMARY

The disclosure herein provides, according to a first aspect, a landing system for an aircraft. The landing system is configured to calculate a reference path for use during a non-precision approach to a runway. The reference path comprises a course, a flight path angle, and an anchor point. The anchor point has a longitude, a latitude and an altitude. The landing system is configured to extract from a navigation database a missed approach point corresponding to a first landing threshold point of the runway. The missed approach point has a longitude, a latitude and an altitude. The landing system may be configured such that calculation of the reference path comprises setting the altitude of the anchor point with use of the altitude of the missed approach point.

Using the missed approach point to determine the altitude of the anchor point of the reference path allows the landing system to calculate the reference path using information related to the approach procedure, even if the landing threshold point applicable to that landing is not stored in the navigation database. Thus, particularly in cases where the relevant landing threshold point is not stored in the navigation database, the reference path may more accurately represent the desired path of the aircraft towards the runway. This may allow the aircraft to be automatically steered (e.g. using an autopilot function) towards the runway in such situations. Pilot workload may thus be reduced, for example, by avoiding manual flying of the aircraft or late changes in approach selection by the crew due to the aircraft following an incorrect or non-ideal path to the runway.

The first landing threshold point may be a displaced landing threshold point. Alternatively, the first landing threshold point may be a regular (e.g. standard, usual, normal, non-displaced) landing threshold point. The first landing threshold point may have a longitude, latitude and an altitude. The first landing threshold point may be associated with a course (e.g. heading, bearing) and/or a flight path angle (e.g. gradient, slope).

There may be a second landing threshold point for the runway (different from the first landing threshold point). The second landing threshold point may be a regular (e.g. standard, usual, normal, non-displaced) landing threshold point. The second landing threshold point may have a longitude, latitude and an altitude. The second landing threshold point may be associated with a course and/or a flight path angle.

The landing system may form part of an aircraft control system. The aircraft control system may comprise the navigation database. The navigation database contains the missed approach point. The navigation database may contain the first landing threshold point. The navigation database may contain the second landing threshold point.

The navigation database may be configured to contain a maximum of one landing threshold point for a given runway. That is to say, the relevant software and/or hardware may not allow more than one landing threshold point to be stored in the navigation database for a given runway. The navigation database may be configured to contain a maximum of one landing threshold point for a given runway and landing direction on that runway. In embodiments, the navigation database does not contain the first landing threshold point.

A landing threshold point which is stored in the navigation database may be referred to as a stored landing threshold point. The first landing threshold point and/or the second landing threshold point may be a stored landing threshold point. In embodiments, the first landing threshold point is not a stored landing threshold point, whereas the second landing threshold point is a stored landing threshold point.

The landing system may be configured to compare the location of the missed approach point and the first landing threshold point. If the first landing threshold point is not stored in the navigation database, the landing system may be configured to compare the location of the missed approach point and the second landing threshold point. The landing system may be configured to compare the location of the missed approach point and the stored landing threshold point. The landing system may be configured (e.g. prior to the comparison) to extract from the navigation database the stored landing threshold point of the runway.

The landing system may comprise a first mode. The first mode may be for use when the missed approach point is located at the first landing threshold point and/or second landing threshold point. The first mode may be for use when the missed approach point is located at the stored landing threshold point. The missed approach point may be taken to be located at the applicable landing threshold point when the longitude and latitude of those points are substantially equal (substantially equal being taken to include equal).

The landing system may (e.g. in the first mode) be configured such that calculation of the reference path comprises setting the altitude of the anchor point to a value equal to the altitude of the missed approach point.

The landing system may (e.g. in the first mode) be configured such that calculation of the reference path comprises setting the latitude of the anchor point to a value equal to the latitude of the missed approach point. The landing system may (e.g. in the first mode) be configured such that calculation of the reference path comprises setting the longitude of the anchor point to a value equal to the longitude of the missed approach point.

The missed approach point may be associated with a flight path angle. The landing system may (e.g. in the first mode) be configured such that calculation of the reference path comprises setting the flight path angle of the reference path to the flight path angle associated with the missed approach point. The flight path angle associated with a point (e.g. a missed approach point or a landing threshold point), may be the flight path angle going to that point (e.g. from the previous point in the flight plan).

The missed approach point may be associated with a course. The landing system may (e.g. in the first mode) be configured such that calculation of the reference path comprises setting the course of the reference path to the course associated with the missed approach point. The course associated with a point (e.g. a missed approach point or a landing threshold point), may be the course going to that point (e.g. from the previous point in the flight plan).

The landing system may comprise a second mode. The second mode may be for use when the missed approach point is located before the first landing threshold point and/or second landing threshold point. The second mode may be for use when the missed approach point is located before the stored landing threshold. The missed approach point may be taken to be located before the applicable landing threshold point when the missed approach point is located at a point, in the planned flight path of the aircraft, reached in advance of the applicable landing threshold point.

The landing system may be configured (e.g. in the second mode) to extract from the navigation database the stored landing threshold point of the runway. The landing system may be configured (e.g. in the second mode) such that calculation of the reference path comprises calculating the location (latitude and longitude) of a pseudo-final end point (pseudo-FEP) for the stored landing threshold point.

Calculating the pseudo-FEP may comprise determining the location (e.g. in the horizontal plane) of an intersection point between (i) an extension of a final approach leg course and (ii) an arc centered on the missed approach point and passing through the stored landing threshold point. The pseudo-FEP may be taken to be located at the intersection point. The pseudo-FEP may be calculated in this way if the final approach leg course and the heading of the runway (i.e. the landing direction taken along the longitudinal axis of the runway) are parallel within a predetermined tolerance. In other words, the pseudo-FEP may be calculated in this way if where the course difference between the final approach leg course and the heading of the runway is less than or equal to a first threshold value. The tolerance (first threshold value) may be in the range 2 to 4 degrees. For example, the tolerance (first threshold value) may be 3 degrees.

Calculating the pseudo-FEP may comprise determining the location (e.g. in the horizontal plane) of a first intersection point between (i) an extension of a final approach leg course and (ii) an extension of a longitudinal axis of the runway. Calculating the pseudo-FEP may comprise determining the location (e.g. in the horizontal plane) of a second intersection point between (i) the extension of the final approach leg course and (ii) an arc centered on the first intersection point and passing through the stored landing threshold point. The pseudo-FEP may be taken to be located at the second intersection point. The pseudo-FEP may be calculated in this way if the final approach leg course are not parallel with the predetermined tolerance (i.e. the course difference between the final approach leg course and the heading of the runway is more than the first threshold value), and the course difference between the final approach leg course and the heading of the runway is less than or equal to a second threshold value. The second threshold value may be in the range 45 to 55 degrees. For example, the second threshold value may be 50 degrees. In embodiments, the pseudo-FEP is calculated in this way if the course change is more than 3 degrees and less than or equal to 50 degrees.

The final approach leg may be the (straight line) course between the missed approach point and the preceding waypoint. The preceding waypoint may be the final approach fix (FAF). The final approach fix and/or the final approach leg course may be contained within the navigation database. The final approach fix and/or the final approach leg course may be predetermined, for example by an airport operator.

The landing system may be configured (e.g. in the second mode) such that calculation of the reference path comprises setting the latitude of the anchor point to a value equal to the latitude of the pseudo-FEP so calculated. The landing system may be configured (e.g. in the second mode) such that calculation of the reference path comprises setting the longitude of the anchor point to a value equal to the longitude of the pseudo-FEP so calculated.

The landing system may be configured (e.g. in the second mode) such that calculation of the reference path comprises calculating a horizontal distance between the missed approach point and the pseudo-FEP so calculated.

The landing system may be configured (e.g. in the second mode) such that calculation of the reference path comprises setting the altitude of the anchor point to a value equal to the altitude of the missed approach point less a vertical distance equal to the product of: (i) a tangent of the flight path angle associated with the first missed approach point and (ii) the horizontal distance between the missed approach point and the pseudo-FEP so calculated. In other words, calculation of the reference path may comprise setting the altitude of the anchor point to the altitude at which the course associated with the missed approach point passes through the pseudo-FEP.

The landing system may be configured (e.g. in the second mode) such that calculation of the reference path comprises setting the flight path angle of the reference path to the flight path angle associated with the missed approach point.

The landing system may be configured (e.g. in the second mode) such that calculation of the reference path comprises setting the course of the reference path to the course associated with the missed approach point.

The landing system may be configured to use the reference path to calculate a decent profile that can be used to guide the aircraft during a non-precision approach to the runway. The landing system may be configured to automatically steer the aircraft with use of the reference path during an (e.g. non-precision) approach to the runway. The landing system may be configured to determine a deviation between a trajectory (and/or position) of the aircraft and the reference path. The deviation may comprise a lateral deviation and/or a vertical deviation. The landing system may be configured to send an instruction to alter flight control surfaces (e.g. using an autopilot system) to minimise the deviation. The landing system may be configured, in use, to display the horizontal and/or vertical deviation of the aircraft from the reference path. The landing system may be configured to automatically steer the aircraft until a minimum decision altitude (MDA) is reached.

In some embodiments, the landing system may calculate the reference path in accordance with the first aspect for landings where the navigation database does not contain the landing threshold point applicable for the landing (i.e. when the first landing threshold point is not a stored landing threshold point); and the landing system calculates the reference beam using known methods, such as that described in the background (e.g. where the altitude of the anchor point is taken to be equal to the altitude of the landing threshold point plus a threshold cross height), for landings where the navigation database does contain the landing threshold point applicable for the landing.

There may be a second missed approach point corresponding to the second landing threshold point. The second missed approach point may have a longitude, latitude and an altitude. The second missed approach point may be associated with a course and/or a flight path angle. The navigation database may contain the second missed approach point.

The landing system may comprise a plurality of modules, each module configured to perform different calculations. For example, the landing system may comprise a first module which is configured to determine the anchor point, and a second module which is configured to determine deviations of the aircraft position from the reference path. The second module may be a multi-mode receiver (MMR).

The disclosure herein provides, according to a second aspect, an aircraft control system comprising a landing system and a navigation database. The landing system is a landing system according to the first aspect. The navigation database may have any of the features, and contain any of the information, set out in relation to the landing system according to the first aspect.

The disclosure herein provides, according to a third aspect, an aircraft comprising an aircraft control system according to the second aspect.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably under-wing, engines.

The disclosure herein provides, according to a fourth aspect, a method of calculating a reference path for use during an approach (e.g. a non-precision approach) to a runway. The reference path comprises a course, a flight path angle, and an anchor point. The anchor point has a longitude, a latitude and an altitude. The method comprises a step of extracting from a navigation database a missed approach point (for the approach) corresponding to a first landing threshold point of the runway. The missed approach point has a longitude, a latitude and an altitude. The method comprises a step of setting the altitude of the anchor point with use of the altitude of the first missed approach point. The method may comprise any further steps which the landing system of the first aspect is described as being configured to perform, particularly, but not exclusively, those steps of calculating or determining.

The disclosure herein provides, according to a fifth aspect, a method of landing an aircraft on a runway, the method comprising calculating a reference path according to the fourth aspect. The runway may comprise multiple landing threshold points. The method may comprise determining a deviation between a trajectory (and/or position) of the aircraft and the reference path. The deviation may comprise a lateral deviation and/or a vertical deviation. The method may comprise displaying the deviation to a pilot. The method may comprise automatically altering flight control surfaces (e.g. using an autopilot system) to minimise the deviation. The method may comprise a step of performing an approach, for example a non-precision approach. It may be that the approach does not include the use of ILS, MLS or GLS.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

The term 'or' shall be interpreted as 'and/or' unless the context requires otherwise.

BRIEF DESCRIPTION OF THE DRAWINGS

Embodiments of the disclosure herein will now be described by way of example only with reference to the accompanying schematic drawings of which.

DETAILED DESCRIPTION

Figure 5:
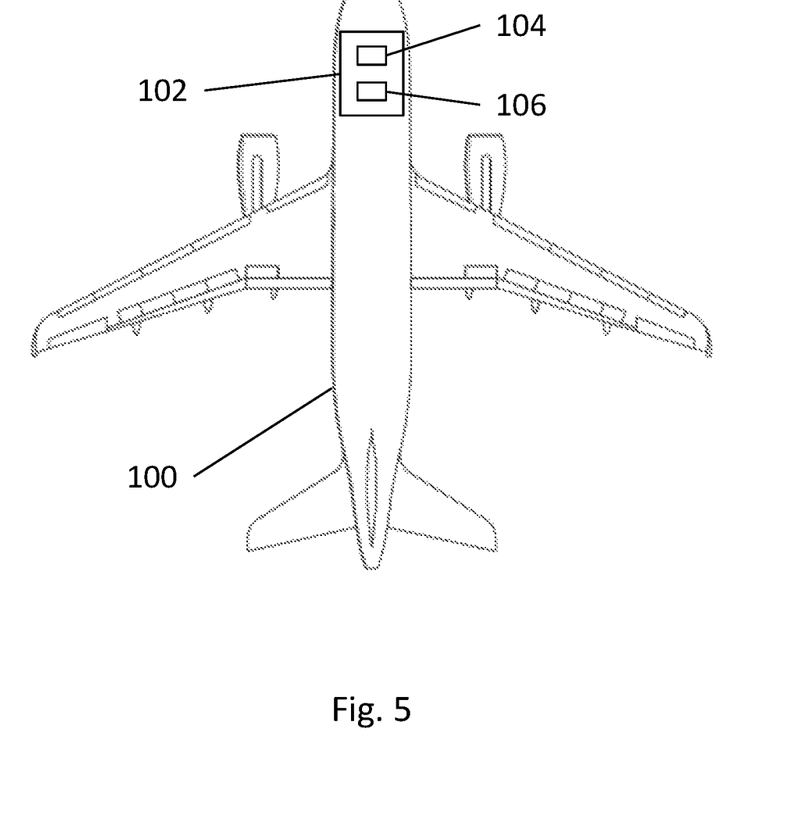
FIG. 5 shows an aircraft according to a first embodiment of the disclosure herein.

FIG. 5 shows an aircraft 100 according to a first embodiment of the disclosure herein. The aircraft 100 comprises an aircraft control system 102 comprising a landing system 104 and a navigation database 106. The navigation database 106 comprises data relating to the flight plan of the aircraft 100, including waypoints, routes and runway approach information.

Figure 6:
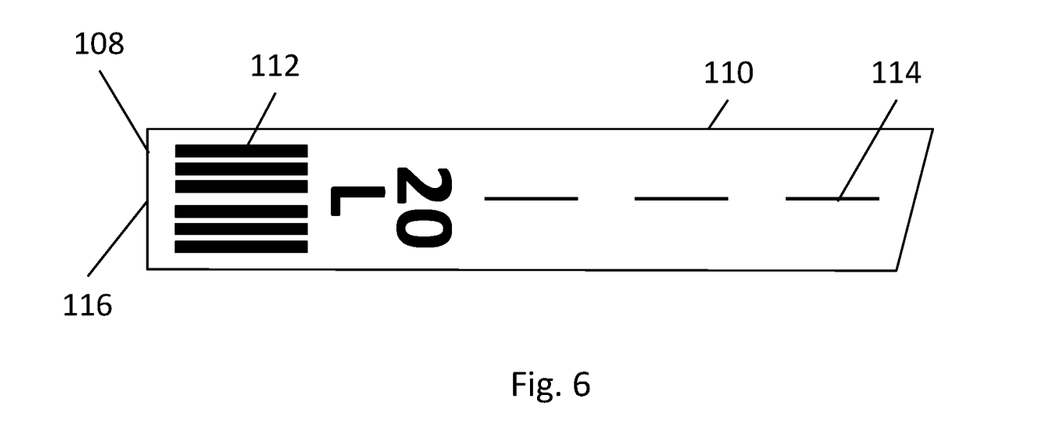
FIG. 6 shows an overhead view of a first example landing runway.

FIG. 6 shows an example landing runway 110. The runway 110 comprises a runway threshold 108 at one end. The runway threshold 108 denotes the beginning of the designated space for landing. Threshold markings 112 are provided adjacent the runway threshold 108 to help pilots identify the location of the runway threshold 108. A landing threshold point 116 is defined for the runway 110 and stored in the navigation database 106. The landing threshold point 116 is a point at the designated center of the runway threshold 108, and is located at the intersection between the runway center line 114 and the runway threshold 108. The navigation database 106 contains the latitude, longitude and altitude of the landing threshold point 116. The landing threshold point 116 is also associated with a course (e.g. a bearing/heading) and a flight path angle, both of which are also contained in the navigation database 106. On account of being stored in the navigation database 106, the landing threshold point 116 shall referred to as stored landing threshold point 116.

An approach procedure for the runway 110 has been determined, for example by the airport operator. The approach procedure defines a missed approach point (MAP), at which the pilot must initiate a missed approach procedure if landing criteria have not been met. The navigation database 106 contains the latitude, longitude and altitude of the missed approach point. The missed approach point is also associated with a course and a flight path angle which are also stored in the navigation database 106.

The landing system 104 is configured to calculate a reference path which can be used to guide the aircraft 100 to the runway 110 during a non-precision approach. How the reference path is calculated depends on the position of the missed approach point relative to runway 110, and in particular relative to the stored landing threshold point 116. Accordingly, the landing system 104 is configured to extract from the navigation database 106 the missed approach point 126 and the stored landing threshold point 116, and to calculate, prior to landing at the runway 110, the position of the missed approach point relative to the location of the stored landing threshold point 116, and to determine whether the missed approach point is located at, or before, or after the stored landing threshold point 116.

The disclosure herein is concerned with the situations where the missed approach point is located at or before the stored landing threshold point 116. The missed approach point is deemed to be located at the stored landing threshold point 116 when the longitude and latitude of those points are substantially equal. The missed approach point is deemed to be located before the stored landing threshold point 116 when the missed approach point is located at a point, in the planned flight path of the aircraft, reached in advance of the stored landing threshold point 116.

If the missed approach point is determined to be located at the stored landing threshold point 116, the landing system 104 is configured into a first mode of operation. If the missed approach point is determined to be located before the stored landing threshold point 116, the landing system 104 is configured into a second mode of operation.

Figure 7:
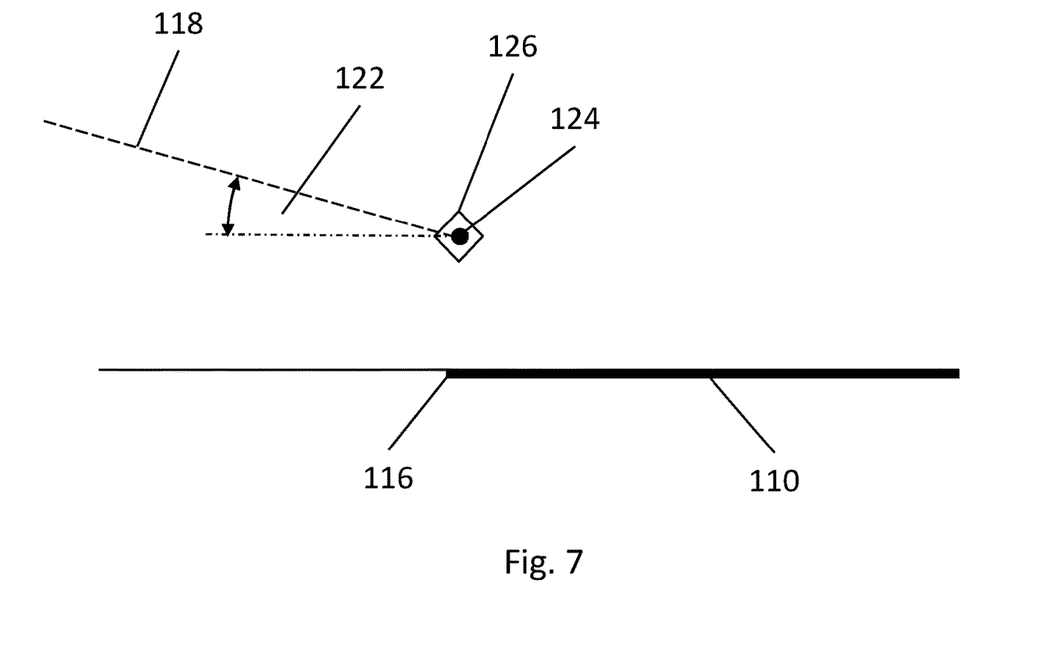
FIG. 7 shows a side view of the first landing runway with a reference path calculated by a landing system according to the first embodiment, a missed approach point being located at the landing threshold point.

The first mode will now be illustrated with reference to FIG. 7, which shows a view of the runway 110 in the vertical plane with a missed approach point 126 located at the stored landing threshold point 116 (although the missed approach point 126 has a greater altitude than the stored landing threshold point 116). A reference path 118 for landing of the aircraft 100 on the runway 110 is shown as a dashed line. The reference path 118 comprises a course, a flight path angle 122, and an anchor point 124. The anchor point 124 has latitude, longitude, and an altitude.

In the first mode, calculating the reference path 118 comprises the landing system 104 setting: the latitude and longitude of the anchor point 124 to values equal, respectively, to the latitude and longitude of the missed approach point 126; the altitude of the anchor point 124 to a value equal to the altitude of the missed approach point 126; the flight path angle 122 of the reference path 118 to the flight path angle associated with the missed approach point 126; and the course of the reference path 118 to the course associated with the missed approach point 126. Once these values are set, the position and direction of the reference path 118 is defined in three-dimensional space. The landing system 104 can then use the reference path 118 in a known manner to calculate a descent profile that can be used to guide the aircraft 110 during a non-precision approach to the runway 110.

Figure 8:
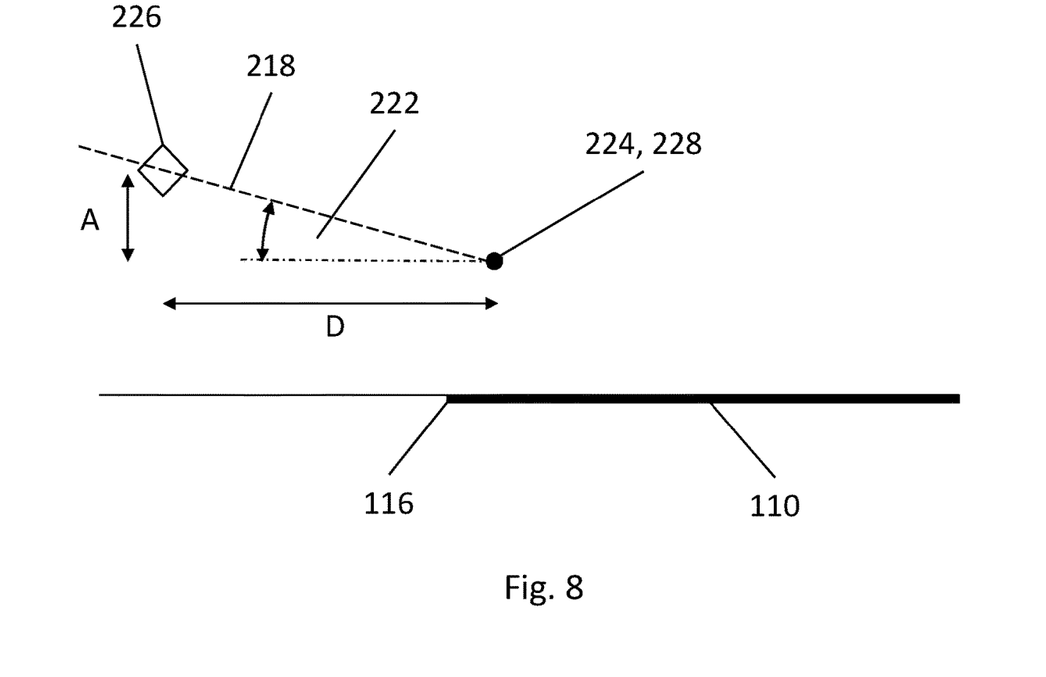
FIG. 8 shows a side view of the first landing runway with a reference path calculated by a landing system according to the first embodiment, a missed approach point being located before the landing threshold point.

The second mode will now be illustrated with reference to FIG. 8, which shows a second view of the runway 110 in the vertical plane with a missed approach point 226 located before the landing threshold point 116. A reference path 218 for landing of the aircraft 100 on the runway 110 is shown as a dashed line. The reference path 218 comprises a course, a flight path angle 222, and an anchor point 224. The anchor point 224 has latitude, longitude, and an altitude.

In the second mode, calculating the reference path 218 comprises the landing system 104 calculating the location (latitude and longitude) of a pseudo final end point (pseudo-FEP) for the stored landing threshold point 116. How the pseudo-FEP is calculated depends on the final approach leg course relative to the heading of the runway (i.e. the direction of the longitudinal axis of the runway). Accordingly, the landing system 104 is configured to calculate, prior to landing at a given runway 110, the course difference between the final approach leg course and the heading of the runway.

Figure 9A:
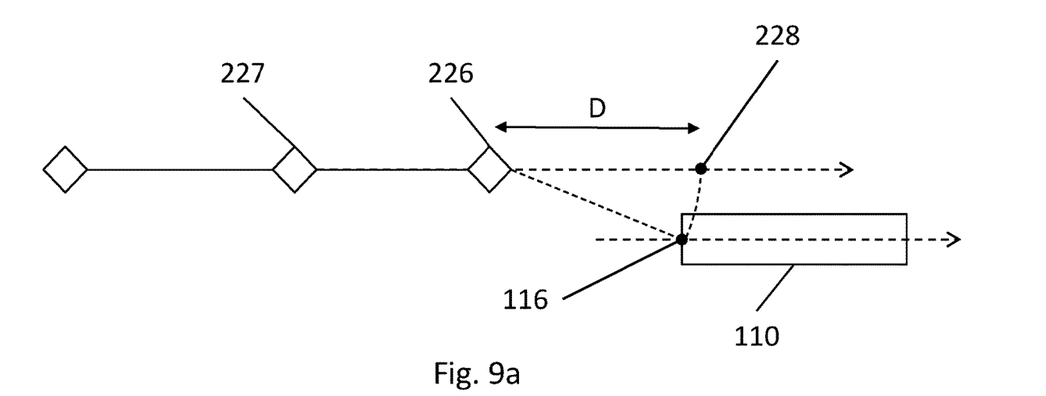
FIGS. 9a, 9b and 9c show overhead views of the first landing runway with the longitudinal axis of the runway at various different angles to the final approach leg course.

FIG. 9a shows a situation where the final approach leg course and the heading of the runway are parallel within a 3 degree tolerance. In other words, where the course difference ($\Delta C$) between the final approach leg course and a heading of the runway is less than or equal to a first threshold value of 3 degrees (i.e. $0° \leq \Delta C \leq 3°$. The final approach leg course is the course between the missed approach point 226 and the preceding waypoint 227. In this situation, the landing system determines the pseudo-FEP 228 to be located at an intersection point between (i) an extension of a final approach leg course and (ii) an arc centered on the missed approach point 226 and passing through the stored landing threshold point 116. It will be appreciated that the calculations are performed in the horizontal plane.

Figure 9B:
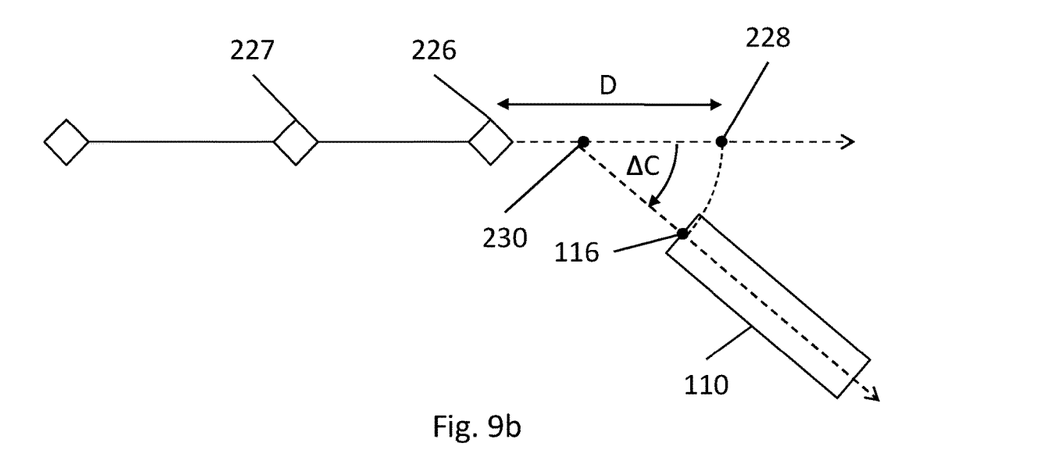

FIG. 9b shows a situation where the final approach leg course is not parallel with the heading of the runway within a 3 degree tolerance, but the course difference (ΔC) between the final approach leg course and the heading of the runway is less than or equal to a second threshold value of 50 degrees (i.e. 3°≤ΔC≤50°). In this situation, the landing system 104 determines the location of a first intersection point 230 between (i) an extension of the final approach leg course and (ii) an extension of the longitudinal axis of the runway. The landing system 104 then determines the pseudo-FEP 228 to be located at a second intersection point between (i) the extension of the final approach leg course and (ii) an arc centered on the first intersection point 230 and passing through the stored landing threshold point 116.

Figure 9C:
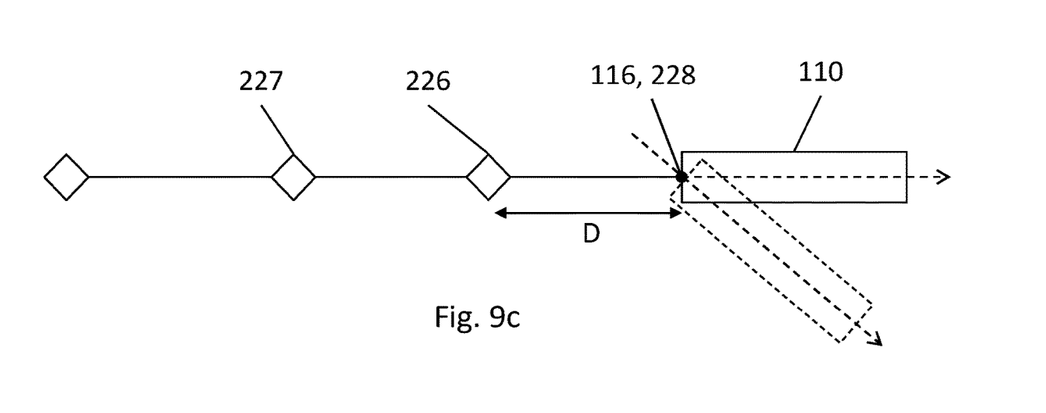

FIG. 9c shows a situation where an extension of the final approach leg course passes (in the horizontal plane) through the stored landing threshold point 116 and the course difference (ΔC) between the final approach leg course and the heading of the runway is lower than 50 degrees. In this situation, the aforementioned arcs have zero length, and the pseudo-FEP 228 is located at the same latitude and longitude as the landing threshold point 116.

In the second mode, calculating the reference path 218 comprises the landing system 104 setting: the latitude and longitude of the anchor point 224 to values equal, respectively, to the latitude and longitude of the pseudo-FEP 228; the flight path angle 222 of the reference path 218 to the flight path angle associated with the missed approach point 226; and the course of the reference path 218 to the course associated with the missed approach point 226.

The landing system 104 is further configured to calculate a horizontal distance (D) between the missed approach point 226 and the pseudo-FEP 228. The altitude of the anchor point 224 is set to a value equal to the altitude of the missed approach point 226 less a vertical distance (A) equal to the product of: (i) a tangent of the flight path angle 222 associated with the missed approach point 226 and (ii) the horizontal distance (D) between the missed approach point 226 and the pseudo-FEP 228. Put differently, the altitude of the anchor point 224 is set to the altitude at which the course associated with the missed approach point 226 passes through the location (latitude and longitude) of the pseudo-FEP 228

As above, once the flight path angle, the course, and the location of the anchor point 224 are known, the position and direction of the reference path 218 is defined in three-dimensional space. The landing system 104 can then use the reference path 218 in a known manner to calculate a decent profile that can be used to guide the aircraft 100 during a non-precision approach to the runway 110. Should the course difference (ΔC) between the final approach leg course and the heading of the runway exceed the second threshold value of 50 degrees (i.e. ΔC>50° C.), the landing system 104 shall not calculate a pseudo-FEP. Consequently, in this situation no reference path can be calculated and the pilot shall be informed that a different method must be used to land the aircraft 100.

Figure 10:
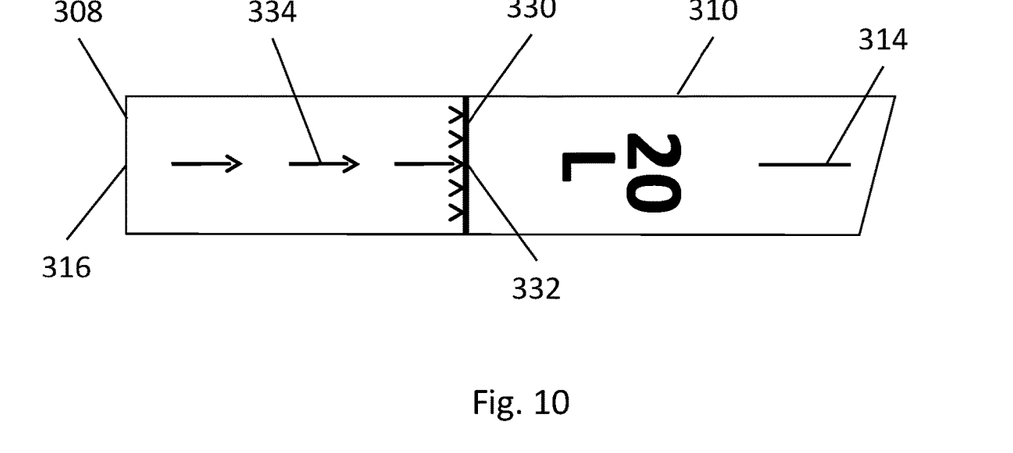
FIG. 10 shows an overhead view of a second example landing runway having a displaced runway threshold.

FIG. 10 shows a second example landing runway 310 with a temporarily displaced runway threshold 330. Arrows 334 point towards the displaced runway threshold 330 as an indication to pilots that the threshold has been displaced. A displaced (first) landing threshold point 332 is defined for the displaced runway threshold 330. The displaced landing threshold point 332 is a point at the designated center of the displaced runway threshold 330 and is located at the intersection between the runway center line 314 and the displaced runway threshold 330. The regular (e.g. standard, non-displaced) runway threshold 308 and the corresponding (second) landing threshold point 316 are also shown in FIG. 10 at the end of the surface of the runway 310.

An approach procedure for landing on the runway 310 has been determined, for example by the airport operator. The approach procedure defines a missed approach point (MAP) corresponding to the displaced runway threshold 330. The navigation database 106 contains the latitude, longitude and altitude of the missed approach point. The missed approach point is also associated with a course and a flight path angle which are also stored in the navigation database 106.

In this embodiment, the navigation database 106 can store a maximum of one landing threshold point per runway and landing direction on that runway. The regular (second) landing threshold point 316 for the runway 310 is stored in the navigation database 106, but displaced (first) landing threshold point 332 for the runway 310 is not. On account of being stored in the navigation database 106, the regular (second) landing threshold point 316 shall be referred to as the stored landing threshold point 316. The navigation database 106 contains the latitude, longitude and altitude of the stored landing threshold point 316.

Prior to a non-precision approach to the runway 310, the landing system 104 calculates a reference beam for guiding the aircraft 100 to the runway 310. To calculate the reference beam, the landing system 104 firstly determines the position of the missed approach point relative to the location of the runway 310. The displaced landing threshold point 332 is not stored in the navigation database 106 and is therefore unavailable for performing the comparison. The landing system 104 therefore determines the position of the missed approach point relative to the location of the stored landing threshold point 316.

As previously described, if the landing system 104 determines that the missed approach point is located at the stored landing threshold point 316 (in respect of latitude and longitude), the landing system 104 is used in a first mode; and if the landing system 104 determines that the missed approach point is located before the stored landing threshold point 316, the landing system 104 is used in a second mode.

Figure 11:
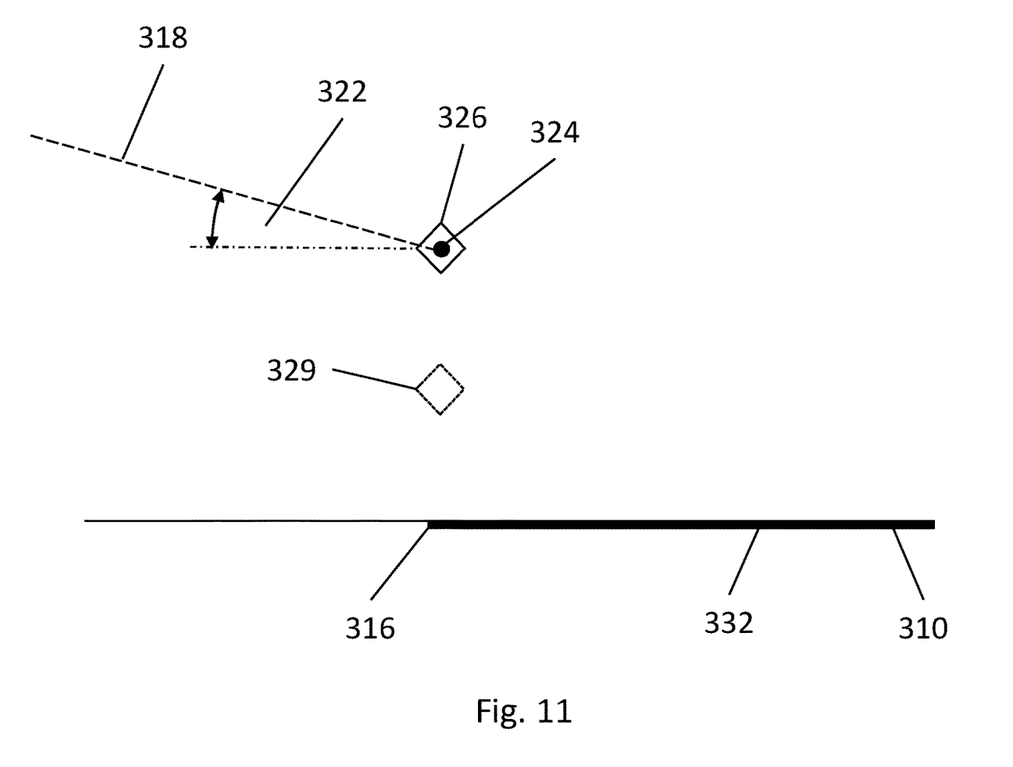
FIG. 11 shows a side view of the second landing runway with a reference path calculated by a landing system according to the first embodiment, a missed approach point being located at the landing threshold point.

FIG. 11 shows a view of the runway 310 in the vertical plane with a missed approach point 326, corresponding to the displaced runway threshold 332, located at the stored landing threshold point 316. A reference path 318 for landing of the aircraft 100 on the runway 310 is shown as a dashed line. The reference path 318 comprises a course, a flight path angle 322, and an anchor point 324. The anchor point 324 has latitude, longitude, and an altitude. For comparison, a second missed approach point 329 corresponding to the usual (second) landing threshold point 316 is also shown in FIG. 11.

As described above, in the first mode, calculating the reference path 318 comprises the landing system 104 setting: the latitude and longitude of the anchor point 324 to values equal, respectively, to the latitude and longitude of the missed approach point 326; the altitude of the anchor point 324 to a value equal to the altitude of the missed approach point 326; the flight path angle 322 of the reference path 318 to the flight path angle associated with the missed approach point 326; and the course of the reference path 318 to the course associated with the missed approach point 326.

Figure 12:
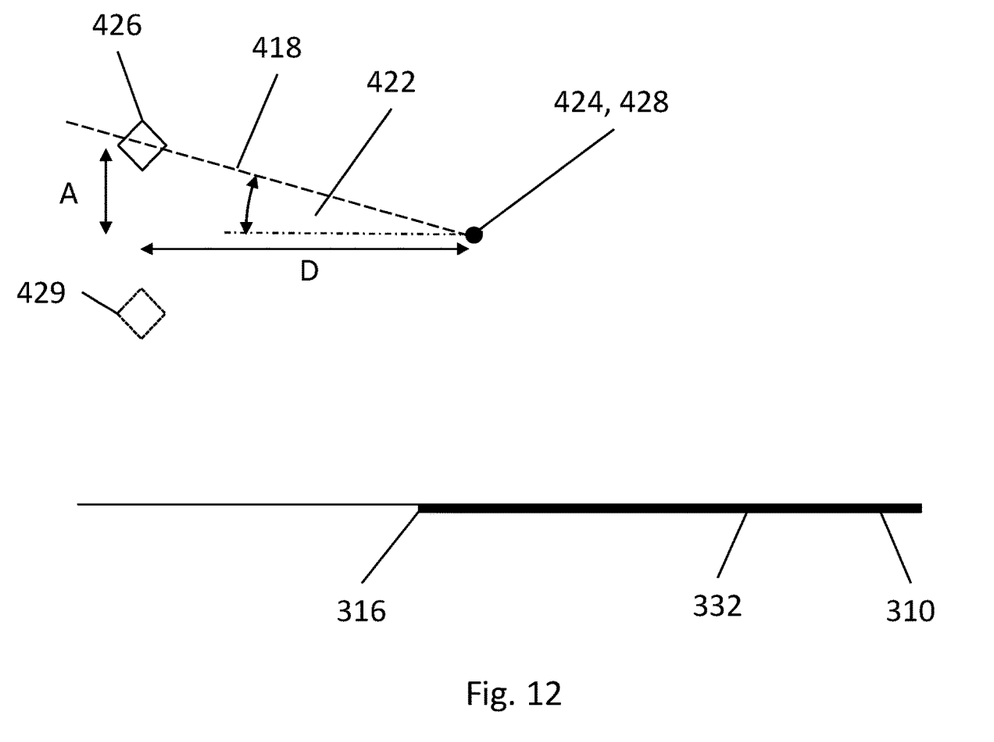
FIG. 12 shows a side view of the second landing runway with a reference path calculated according to the first embodiment, a missed approach point being located before the landing threshold point.

FIG. 12 shows a second view of the runway 310 in the vertical plane with a missed approach point 426, corresponding to the displaced runway threshold 332, located before the stored landing threshold point 316. A reference path 418 for landing of the aircraft 100 on the runway 310 is shown as a dashed line. The reference path 418 comprises a course, a flight path angle 422, and an anchor point 424. The anchor point 424 has latitude, longitude, and an altitude. For comparison, a second missed approach point 429 corresponding to the usual (second) landing threshold point 316 is also shown in FIG. 12.

As described above, in the second mode, calculating the reference path 418 comprises the landing system 104 calculating the location of a pseudo-FEP 428. The displaced landing threshold point 332 is not stored in the navigation database 106 and is therefore unavailable for the calculation. The landing system 104 therefore determines the pseudo-FEP 428 on the basis of the stored landing threshold point 316.

As described above, in the second mode, calculating the reference path 418 comprises the landing system 104 setting: the latitude and longitude of the anchor point 424 to values equal, respectively, to the latitude and longitude of the pseudo-FEP 428; the flight path angle 422 of the reference path 418 to the flight path angle associated with the missed approach point 426; and the course of the reference path 418 to the course associated with the missed approach point 426.

The landing system 104 is further configured to calculate a horizontal distance (D) between the missed approach point 426 and the pseudo-FEP 428. The altitude of the anchor point 424 is set to a value equal to the altitude of the missed approach point 426 less a vertical distance (A) equal to the product of: (i) a tangent of the flight path angle 422 associated with the missed approach point 426 and (ii) the horizontal distance (D) between the missed approach point 426 and the pseudo-FEP 428.

As will be appreciated from the foregoing examples, the landing system 104 is capable of calculating an appropriate reference path for an approach to a runway having a displaced threshold, regardless of whether the navigation database comprises the landing threshold point for that displaced threshold.

The landing system 104 could also be used for landing at runways with multiple regular runway thresholds. In alternative embodiments, the aforementioned displaced threshold is instead a second, regular, runway threshold, for example used for different aircraft types, but not having the corresponding landing threshold point stored in the navigation database.

While the disclosure herein has been described and illustrated with reference to particular embodiments, it will be appreciated by those of ordinary skill in the art that the disclosure herein lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the claims. Moreover, it is to be understood that such optional integers or features, while of possible benefit in some embodiments of the disclosure herein, may not be desirable, and may therefore be absent, in other embodiments.

The subject matter disclosed herein can be implemented in or with software in combination with hardware and/or firmware. For example, the subject matter described herein can be implemented in or with software executed by a processor or processing unit. In one exemplary implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing system for an aircraft, wherein:
the landing system is configured to calculate a reference path for use during a non-precision approach to a runway, the reference path comprising a course, a flight path angle, and an anchor point, the anchor point having a longitude, a latitude, and an altitude;
the landing system is configured to extract from a navigation database a missed approach point corresponding to a first landing threshold point of the runway, the missed approach point having a longitude, a latitude and an altitude;
the landing system is configured such that calculation of the reference path comprises setting the altitude of the anchor point with use of the altitude of the missed approach point;
the missed approach point is associated with the flight path angle;
the landing system is configured to extract from the navigation database a stored landing threshold point of the runway, the stored landing threshold point having a longitude, a latitude and an altitude; and
the landing system is configured such that calculation of the reference path comprises:
calculating a location of a pseudo final end point (pseudo-FEP) for the stored landing threshold point;
calculating a horizontal distance between the missed approach point and the pseudo-FEP so calculated; and
setting the altitude of the anchor point to a value equal to the altitude of the missed approach point less a vertical distance equal to the product of: (i) a tangent of the flight path angle associated with the missed approach point and (ii) the horizontal distance between the missed approach point and the pseudo-FEP so calculated.

2. The landing system according to claim 1, wherein the landing system is configured such that calculation of the reference path comprises setting the latitude and longitude of the anchor point to values equal, respectively, to the latitude and longitude of the missed approach point.

3. The landing system according to claim 1, wherein the missed approach point is associated with a flight path angle, and wherein the landing system is configured such that calculation of the reference path comprises setting the flight path angle of the reference path to the flight path angle associated with the missed approach point.

4. The landing system according to claim 1, wherein the missed approach point is associated with a course, and wherein the landing system is configured such that calculation of the reference path comprises setting the course of the reference path to the course associated with the missed approach point.

5. The landing system according to claim 1, wherein calculating the pseudo-FEP comprises determining a location of an intersection point between (i) an extension of a final approach leg course and (ii) an arc centered on the missed approach point and passing through the stored landing threshold point, wherein the pseudo-FEP is taken to be located at the intersection point.

6. The landing system according to claim 1, wherein calculating the pseudo-FEP comprises:
  determining the location of a first intersection point between (i) an extension of a final approach leg course and (ii) an extension of a longitudinal axis of the runway; and
  determining the location of a second intersection point between (i) the extension of the final approach leg course and (ii) an arc centered on the first intersection point and passing through the stored landing threshold point, wherein the pseudo-FEP is taken to be located at the second intersection point.

7. The landing system according to claim 1, wherein the stored landing threshold point is the first landing threshold point.

8. The landing system according to claim 1, wherein the stored landing threshold point is a second landing threshold point of the runway, different from the first landing threshold point.

9. The landing system according to claim 1, wherein the landing system is configured such that calculation of the reference path comprises setting the latitude and longitude of the anchor point to values equal, respectively, to the latitude and longitude of the pseudo-FEP so calculated.

10. The landing system according to claim 1, wherein the landing system is configured such that calculation of the reference path comprises setting the flight path angle of the reference path to the flight path angle associated with the missed approach point.

11. The landing system according to claim 1, wherein the missed approach point is associated with a course, and wherein the landing system is configured such that calculation of the reference path comprises setting the course of the reference path to the course associated with the missed approach point.

12. The landing system according to claim 1, wherein the first landing threshold point of the runway is a displaced landing threshold point.

13. The landing system according to claim 1, wherein the landing system is configured to automatically steer the aircraft with use of the reference path during an approach to the runway.

14. The landing system according to claim 1, wherein the landing system is configured, in use, to display a vertical and/or lateral deviation of the aircraft from the reference path.

15. An aircraft control system comprising:
  a landing system according to claim 1; and
  the navigation database containing the missed approach point.

16. The aircraft control system according to claim 15, wherein the navigation database does not contain the first landing threshold point.

17. An aircraft comprising an aircraft control system according to claim 15.

18. A method of calculating a reference path for use during an approach to a runway, the reference path comprising a course, a flight path angle, and an anchor point, the anchor point having a longitude, a latitude and an altitude; the method comprising:
  extracting from a navigation database a missed approach point corresponding to a first landing threshold point of the runway, the missed approach point having a longitude, a latitude and an altitude; and
  setting the altitude of the anchor point with use of the altitude of the missed approach point;
  wherein:
    the missed approach point is associated with the flight path angle;
    the landing system is configured to extract from the navigation database a stored landing threshold point of the runway, the stored landing threshold point having a longitude, a latitude and an altitude; and
    the landing system is configured such that calculation of the reference path comprises:
      calculating a location of a pseudo final end point (pseudo-FEP) for the stored landing threshold point;
      calculating a horizontal distance between the missed approach point and the pseudo-FEP so calculated; and
      setting the altitude of the anchor point to a value equal to the altitude of the missed approach point less a vertical distance equal to the product of: (i) a tangent of the flight path angle associated with the missed approach point and (ii) the horizontal distance between the missed approach point and the pseudo-FEP so calculated.

19. A method of landing an aircraft on a runway, the method comprising using the method of claim 18 for calculating the reference path.

20. A landing system for an aircraft, wherein:
  the landing system is configured to calculate a reference path for use during a non-precision approach to a runway, the reference path comprising:
    a course;
    a flight path angle; and
    an anchor point, which has a longitude, a latitude, and an altitude;
  the landing system is configured to extract from a navigation database a missed approach point corresponding to a first landing threshold point of the runway, the missed approach point having a longitude, a latitude and an altitude;

the landing system is configured such that calculation of the reference path comprises setting the altitude of the anchor point with use of the altitude of the missed approach point; the landing system comprising:
a first mode in which the landing system is such that calculation of the reference path comprises setting the altitude of the anchor point to a value equal to the altitude of the missed approach point; and
a second mode in which the landing system is configured:
  wherein the missed approach point is associated with the flight path angle,
  wherein the landing system is configured to extract from the navigation database a stored landing threshold point of the runway, the stored landing threshold point having a longitude, a latitude and an altitude; and
  wherein the landing system is configured such that calculation of the reference path comprises:
    calculating a location of a pseudo final end point (pseudo-FEP) for the stored landing threshold point;
    calculating a horizontal distance between the missed approach point and the pseudo-FEP so calculated; and
    setting the altitude of the anchor point to a value equal to the altitude of the missed approach point less a vertical distance equal to the product of: (i) a tangent of the flight path angle associated with the missed approach point and (ii) the horizontal distance between the missed approach point and the pseudo-FEP so calculated.

* * * * *